United States Patent
Krapf et al.

(10) Patent No.: US 7,750,838 B2
(45) Date of Patent: Jul. 6, 2010

(54) MEASURING DEVICE

(75) Inventors: Reiner Krapf, Reutlingen (DE); Heiko Braun, Stuttgart (DE); Michael Mahler, Leinfelden-Echterdingen (DE); Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 215 days.

(21) Appl. No.: 11/997,062

(22) PCT Filed: Oct. 19, 2006

(86) PCT No.: PCT/EP2006/067572

§ 371 (c)(1),
(2), (4) Date: Jan. 28, 2008

(87) PCT Pub. No.: WO2007/051715

PCT Pub. Date: May 10, 2007

(65) Prior Publication Data

US 2008/0198067 A1 Aug. 21, 2008

(30) Foreign Application Priority Data

Oct. 31, 2005 (DE) .................. 10 2005 052 369

(51) Int. Cl.
*G01S 13/00* (2006.01)
(52) U.S. Cl. .................. 342/22; 342/27; 342/82; 342/137

(58) Field of Classification Search .......... 342/22, 342/27, 82–88, 91, 137, 159; 324/67, 228, 324/329
See application file for complete search history.

(56) References Cited

U.S. PATENT DOCUMENTS

| 3,981,012 | A | 9/1976 | Brault et al. |
| 4,356,487 | A | 10/1982 | Herbreteau |
| 6,888,491 | B2 | 5/2005 | Richter |
| 7,605,743 | B2* | 10/2009 | Skultety-Betz et al. ........ 342/22 |
| 2008/0036644 | A1* | 2/2008 | Skultety-Betz et al. ........ 342/22 |
| 2008/0084212 | A1* | 4/2008 | Wieland .................... 324/329 |
| 2008/0198067 | A1* | 8/2008 | Krapf et al. ................ 342/201 |
| 2008/0291076 | A1* | 11/2008 | Skultety-Betz et al. ........ 342/22 |

FOREIGN PATENT DOCUMENTS

| DE | 41 41 469 | 6/1993 |
| WO | 02/44750 | 6/2002 |

* cited by examiner

*Primary Examiner*—John B Sotomayor
(74) *Attorney, Agent, or Firm*—Michael J. Striker

(57) ABSTRACT

The invention relates to a measuring device comprising a transmitter (6) for transmitting (38, 60) a measuring signal (16) that lies within a frequency range, a sensor (8) for receiving (40, 62) an evaluation signal (20) that has been induced by the measuring signal (16) and a control unit (10) for evaluating (42, 66) the evaluation signal (20) to produce a measured result. According to the invention, the function of the control unit (10) is to check the frequency range before the transmission (38, 60) of the measuring signal (16) for the presence of a signal (28) that is independent of the measuring signal (16).

14 Claims, 2 Drawing Sheets

MEASURING DEVICE

CROSS-REFERENCE

The invention described and claimed hereinbelow is also described in PCT/EP2006/067572, filed on Oct. 19, 2006 and DE 10 2005 052 369.2, filed on Oct. 31, 2005. This German Patent Application, whose subject matter is incorporated here by reference, provides the basis for a claim of priority of invention under 35 U.S.C. 119 (a)-(d).

BACKGROUND OF THE INVENTION

The present invention relates to a measuring device.

Measuring devices are known that, in order to detect a property of an object or surroundings, transmit a measurement signal in a frequency range that is considered advantageous for the measurement. It is possible that the measurement signal will interfere with or be interfered with by other devices that are operating in the same frequency range, such as telecommunication devices, data transmission devices, or measuring devices.

SUMMARY OF THE INVENTION

The present invention is directed to a measuring device with a transmitter for transmitting a measurement signal in a frequency range, a sensor unit for receiving an evaluation signal induced by the measurement signal, and a control unit for evaluating the evaluation signal in a measurement result.

It is provided that the control unit is designed to investigate the frequency range for the presence of a signal that is independent of the measurement signal, before the measurement signal is transmitted. A detected signal that is independent of the measurement signal indicates that a device is present that could be interfered with by the measurement signal. The control unit is advantageously provided to prevent the transmission of the measurement signal when a signal is detected, or to form the measurement signal depending on the signal that was detected. It is also possible to take the detected signal into consideration in the evaluation of the evaluation signal, and to thereby obtain a reliable measurement result.

The measuring device advantageously serves to measure and depict a physical quantity and is, in particular, a locating device or a device for moisture measurement, material measurement, material analysis, for measuring drilling depth, or the like. Advantageously, another possible type of measuring device is a measuring device for object detection, such as a device for detecting persons, a safety sensor, or a distance-measuring device. The detected signal is a narrow-band signal, in particular, such as a radio signal or a radar signal, a signal from a communication device in a standard such as Bluetooth, WLAN or the like, or an LSM-Bans signal. Advantageously, the purpose of the check of the control unit is to detect an information-carrying signal. In particular, general noise is advantageously not understood to be a signal that is independent of the measurement signal. Advantageously, the frequency band is investigated before a measurement procedure is started.

In an advantageous embodiment of the present invention, the sensor unit is designed for ultra-broadband operation. This allows a good measurement result to be obtained with a low spectral energy density, e.g., via good resolution of a measured object, good separation of multiple targets, and/or high measuring accuracy in the distance measurement. In addition, the potential for interference with a sensor unit of this type compared with, e.g., radio services that are present, is low due to the low energy density. "Ultra-broadband operation" means the use of a frequency range with a band width of at least 300 MHz or at least 15% of the mid-frequency of the frequency range. The mid-frequency is preferably selected in the frequency range of 1 GHz to 15 GHz. Ultra-broadband operation may be attained by transmitting pulse trains, by transmitting "pseudo-noise trains", by using a frequency-modulated, continual signal, or by using a frequency shift system. Just as advantageously, the transmitter is provided as an alternative or in addition to an ultra-broadband operation.

A check for the presence of a signal that is independent of the measurement signal may be carried out in a particularly simple and cost-favorable manner when the check includes ascertaining the signal power. Advantageously, when the power is being measured, a measurement signal is not transmitted, or a low measurement signal is transmitted, so that an evaluation signal—or only a low evaluation signal—is superposed on the signal. In particular, the control unit is designed to react to the signal with a control command when the power is above a limiting value. In particular, the received power measured by a sensor unit is compared with a reference received power, e.g., that of typical noise.

Reliable detection of the signal may be attained when the control unit is designed to deactivate interference-suppression means before the check is carried out. Interference-suppression means of this type are, e.g., a frequency filter for filtering out cell phone radiation, or a median filter, which—particularly in the presence of pulsed stray radiation—recognizes a signal with a pulse as an "outlier" and removes it from the evaluation.

A reliable check may be attained when the control unit is designed to prevent transmission from occurring before the check is carried out. In this case, a sending aerial is kept free from the measurement signal, in particular. The prevention advantageously takes place before a measurement procedure is started, in particular before an initial transmission after the measuring device has been activated or switched on.

Advantageously, the check includes ascertaining a frequency band of the signal. Data from this frequency band may be disregarded in an evaluation, thereby making it possible for the evaluation to be carried out reliably. In addition, the transmitter may transmit outside of this frequency band and therefore not interfere with the device that was detected.

In a further advantageous embodiment of the present invention, the control unit is designed to evaluate the evaluation signal depending on the signal that was detected. A disturbing influence of the interfering signal may be kept low as a result, e.g., either by disregarding, averaging out, or compensating for interfering frequencies or an interfering frequency band in the evaluation. In this manner, an exact measurement result may be obtained, even in surroundings filled with interference. The dependence of the evaluation on the detected signal may be attained when the signal—or data derived therefrom—is taken into account in the evaluation.

Interference with extraneous devices by the measuring device may be minimized when the control unit is designed to dampen—to prevent, in particular—the transmission of the measurement signal when the signal is detected. Damping may take place by controlling the transmit power—at least in one frequency range—below the transmit power that is emitted when a signal has not been detected. The transmit power may be reduced by a specified amount all at once, or based on the strength of the detected signal. The amount may be a factor. The amount may be stored in the control unit using a data field. To prevent the measurement signal from being transmitted, the transmitter may be switched off or not switched on. It is also possible to switch the transmission signal to a secondary branch, e.g., by connecting to electrical components or to 50 Ohm to ground. In this case, in particular, no emissions are sent to a sending aerial. The transmit power may be reduced by using a lower pulse height, or, as an alternative or in addition thereto, by using a lower pulse repetition frequency.

It is also provided that the check includes the determination of a frequency band of the signal, and that a transmission of the measurement signal is damped—prevented, in particular—in this frequency band. With an ultra-broadband device in particular, the measurement signal may be modified such that the useful spectrum of the measuring device no longer overlaps with the detected frequency band of the signal, or the spectral energy density is reduced in this frequency band. It is also possible to use several modulation frequencies in order to remove the frequency band and simultaneously obtain a large useful bandwidth of the ultra-broadband measuring device. With pseudo-noise trains, the chip rate may be modified depending on the frequency band that was detected. The bandwidth of the useful signal changes as a result, thereby enabling the measurement signal to be attenuated in one or more certain frequency ranges.

Interference with other devices may be minimized and a good measurement result may be simultaneously attained when the control unit is designed to control the transmission of the measurement signal depending on the surroundings of the transmitter, in particular when the signal is detected. If the measuring device is placed on a damping wall, for example, the power of the measurement signal may be set relatively high. When the measuring device is located in the air or on materials that do not dampen as strongly, the power of the measurement signal is advantageously reduced, or the measurement signal is switched off for certain frequency bands, or it is switched off entirely. For this purpose, the control unit is advantageously provided to control output power depending on a signal damping of the surroundings. The signal damping may be detected by performing an orientation measurement with low output power, with which a material property of material in the vicinity of the transmitter is detected and, based thereon, the signal damping is detected, e.g., a surface reflectance from the surroundings, e.g., a wall.

A weak signal may be detected, in particular, when the check includes a pulse check of the signal. In this manner, it is possible to distinguish a signal—e.g., a signal in the known cell phone standard GSM—from background noise particularly easily. The pulse check includes, e.g., a check of the pulse train.

It may be ensured that the measuring device and/or another device is minimally affected when the control unit is designed to control the transmission of the measurement signal depending on the pulses when the signal is detected. The measurement signal may be transmitted, e.g., between the pulses of the signal.

BRIEF DESCRIPTION OF THE DRAWINGS

Further advantages result from the description of the drawing, below. Exemplary embodiments of the present invention are shown in the drawing. The drawing, the description and the claims contain numerous features in combination. One skilled in the art will also advantageously consider the features individually and combine them to form further reasonable combinations.

DETAILED DESCRIPTION OF THE EXEMPLARY EMBODIMENTS

Figure 1:
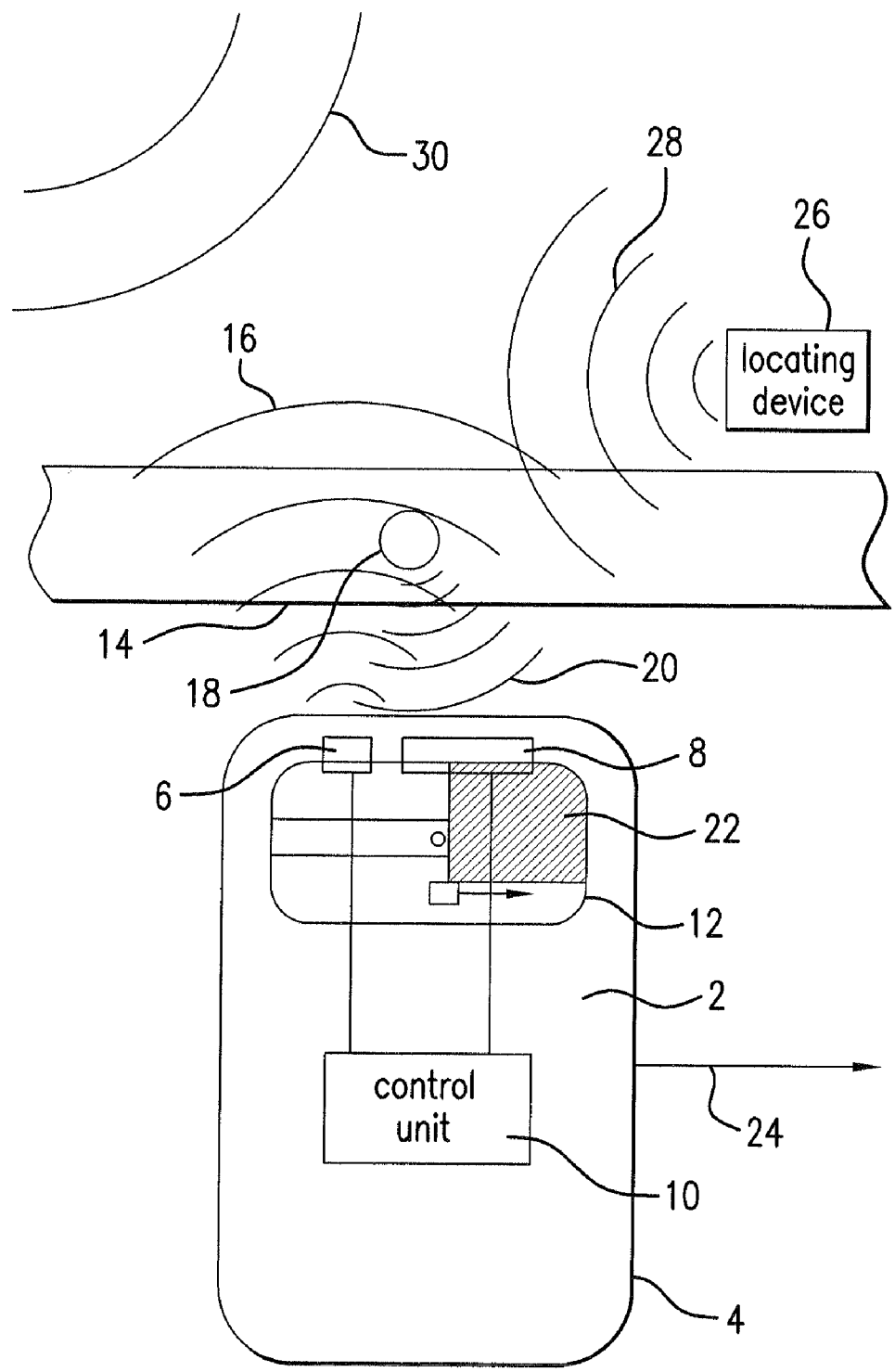
FIG. 1 shows a locating device on a wall within the transmission range of an interfering transmitter.

FIG. 1 shows a measuring device designed as a locating device 2 with a housing 4, a transmitter 6, and a sensor unit 8. A control unit 10 is connected with transmitter 6 and sensor unit 8 to control transmitter 6 and sensor unit 8. Using display unit 12, the result of a measurement—a location, in this case—may be depicted graphically for a user.

In a measuring procedure, locating device 2 may be guided along a wall 14—e.g., in the direction of an arrow 24—which is shown fairly close to locating device 2, for simplicity. Transmitter 6—controlled by control unit 10—transmits a measurement signal 16 in the form of 0.5 ns-long pulses, with which a measurement signal bandwidth of 2 GHz combined with a mid-frequency of 4 GHz is attained. Measurement signal 16 is reflected by wall 14 and an object 18 in the wall and returns to locating device 2 as evaluation signal 20. It is received by sensor unit 8 and evaluated by control unit 10. The region of wall 14—including object 18—that was detected is depicted in display unit 12, and a region 22 that has not yet been detected by locating device 2 is shown shaded in display 12.

A device 26 designed as a transmitter/receiver is hidden behind wall 14. Device 26 emits a signal 28, e.g., radio waves in the microwave range. Signal 28 penetrates wall 14 and forms an interfering signal, since it is received by sensor unit 8 together with evaluation signal 20. Conversely, measurement signal 16 may form an interfering signal for device 26 that impairs the functioning of device 26. A background signal 30 is also shown, which may be received by sensor unit 8 and is formed by a background noise. To minimize the interference of locating device 2 or device 26, control unit 10 is prepared to control a signal interference-suppression procedure, with which transmitter 6 or an evaluation method is controlled in such a manner that interference is minimized.

Figure 2:
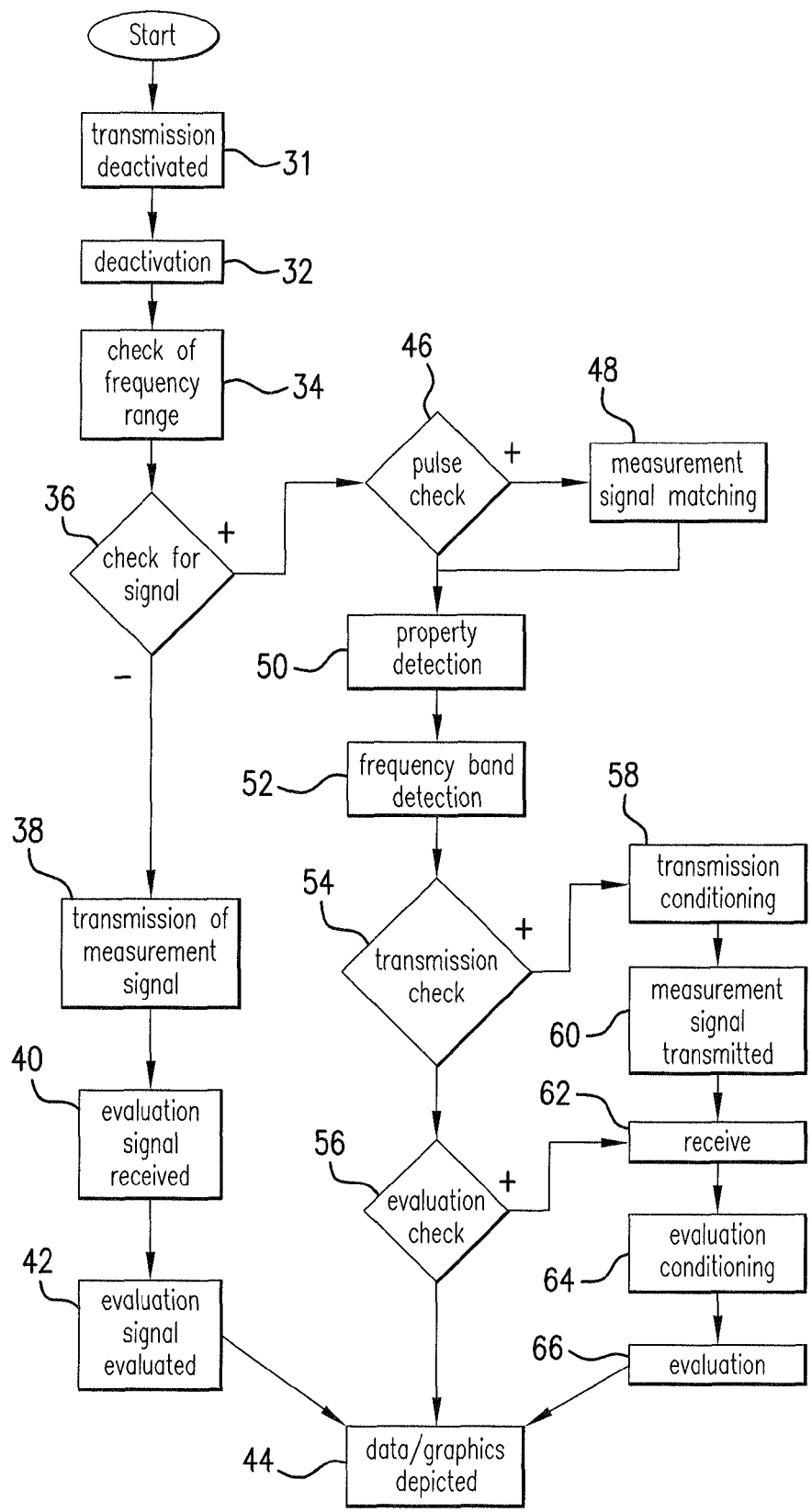
FIG. 2 shows a flow chart of a locating procedure carried out using the locating device.

An exemplary embodiment of a method of this type is shown in FIG. 2 using a flow chart. The method starts, e.g., with a measurement request input by an operator. According to the measurement request, evaluation signal 20 is to be evaluated. To this end, a transmission is deactivated 31 by transmitter 6 being connected to 50 Ohm to ground. In this case, in particular, no emissions are sent to a sending aerial. In a deactivation 32, interference-suppression means—e.g., a median filter—are deactivated, then, in a check 34 of the frequency range provided for measurement signal 16, a check for signal 28 or a similar signal is carried out. To this end, a signal received by sensor unit 8 is checked for the presence of information-carrying signal 28; background signal 30 is not identified as such. If an information-carrying signal 28 is not detected in a check 36, a transmission 38 of measurement signal 16 is initiated with the aid of transmitter 6, with the interference-suppression means possibly having been activated in advance. Evaluation signal 20 is received 40 and evaluated 42, and related data or graphics are depicted 44 on display unit 12.

For the case in which an information-carrying signal 28 is detected in the check 36, a check is performed in a pulse check 46 to determine whether signal 28 is a pulsed signal. For the case in which the signal is a pulsed signal, a mode is started in a measurement signal matching 48 that triggers an eventual transmission of measurement signal 16, e.g., between pulses of signal 28. With a non-pulse-shaped signal 28—or after measurement signal matching 48—control unit 10 starts a property detection 50 of the material in the surroundings of the transmitter, e.g., a damping measurement, a reflectance measurement, or a material detection and, to this end, investigates the material of wall 14 with the aid of a very low-power test signal that is comparable with measurement signal 16, except for its low power. The result of the check is stored in control unit 10. In a further exemplary embodiment, it is also possible to perform property detection 50 in general, i.e., even when a signal 28 was not detected in check 36. In this case, property detection 50 would also be shown in FIG. 2 after check 36. It is left out here, for clarity.

A frequency band detection 52 is now carried out, with which a frequency band in which signal 28 lies is detected. This frequency band includes all frequencies of signal 28. The order in which measurement signal matching 48, material detection 50, frequency band detection 52, and pulse check 46 was selected at random in this case.

In a subsequent transmission check 54, control unit 10 evaluates the results of frequency band detection 52, property detection 50, and pulse check 46, and decides whether measurement signal 16 may be transmitted without likely interfering with device 26. If this is not the case, measurement signal 16 generated in transmission unit 6 is directed to a secondary path in electrical components or to ground. In addition, control unit 10 decides in an evaluation check 56 whether a received signal is usable as an evaluation signal 20, and whether it makes sense to perform an evaluation. If not, information to this extent is output and/or depicted in display unit 12.

If it is decided in transmission check 54, however, that measurement signal 16 may be transmitted at least essentially interference-free, a transmission mode of measurement signal 16 is conditioned in a transmission conditioning 58 depending on the results of the frequency band detection, the material detection, and/or the mode for transmitting measurement signal 16. A transmit power or a transmission frequency range is determined, e.g., sent between pulses. When modulated signals are used as measurement signal 16, e.g., pulse trains or pseudo-noise trains, the frequency of measurement signal 16 is set such that the useful spectrum of measurement signal 16 does not overlap with the detected frequency band of signal 28. With pseudo-noise trains, it is particularly advantageous to change the chip rate and, therefore, the bandwidth of measurement signal 16, in order to markedly attenuate measurement signal 16 in the detected frequency range. If measurement signal 16 is a signal that passes through a frequency range continually or in increments, the detected frequency band may be eliminated altogether.

Measurement signal 16 is now transmitted 60, and evaluation signal 20 is received 62. The transmit power of transmitter 6 is reduced greatly in the detected frequency range, or the power of entire measurement signal 16 is reduced compared with measurement signal 16 without a detected signal 28. If, in evaluation check 56, the decision was made to not transmit measurement signal 16, but it was determined that there is a possibility to evaluate, the process moves from evaluation check 56 directly to receive 62. In an evaluation conditioning 64 initiated by control unit 10, which takes frequency band detection 52 into account, for instance, signal 28 within the detected frequency band is excluded from a subsequent evaluation 66. Otherwise, the measurement result is ascertained from evaluation signal 20 by control unit 10 in evaluation 66, and it is depicted in display unit 12.

What is claimed is:

1. A measuring device, comprising:
    a transmitter (6) for transmitting (38, 60) an ultra-broadband measurement signal (16) located in a gigahertz frequency range;
    a sensor unit (8) for receiving (40, 62) an evaluation signal (20) induced by the measurement signal (16); and
    a control unit (10) for evaluating (42, 66) the evaluation signal (20) in a measurement result, wherein the control unit (10) is configured to investigate the frequency range for the presence of a signal (28) that is independent of the measurement signal (16) with the aid of the sensor unit (8) for receiving (40, 62) the evaluation signal (20), before transmitting (38, 60) the measurement signal (16), wherein the control unit (10) is configured to dampen or prevent the transmission (60) of the measurement signal (16) when the signal (10) is detected.

2. The measuring device as recited in claim 1, wherein the sensor unit (8) is configured for ultra-broadband operation.

3. The measuring device as recited in claim 1, wherein the control unit is configured to ascertain the power of a signal (28).

4. The measuring device as recited in claim 1, wherein the control unit (10) is configured to deactivate (32) interference-suppression means before the check is carried out.

5. The measuring device as recited in claim 1, wherein the control unit (10) is configured to prevent transmission (38, 60) before the check is carried out.

6. The measuring device as recited in claim 1, wherein the control unit (10) is configured to ascertain a frequency band of the signal (28).

7. The measuring device as recited in claim 1, wherein the control unit (10) is configured to perform an evaluation (66) of the evaluation signal (20) depending on the signal (28) that was detected.

8. The measuring device as recited in claim 1, wherein the control unit (10) is configured to control the transmission (60) of the measurement signal (16) depending on the surroundings of the transmitter (6).

9. The measuring device as recited in claim 8, wherein the control unit (10) is configured to control output power depending on the signal damping of the surroundings.

10. The measuring device as recited in claim 1, wherein the control unit is configured to perform a pulse check (46) of the signal (28).

11. The measuring device as recited in claim 1, wherein the control unit (10) is configured to control when the signal (28) is detected as a pulsed signal (28) a transmission (60) of the measurement signal (16) depending on the pulses.

12. A method for enabling transmission of a measuring device, comprising the following steps:
    providing a transmitter (6);
    transmitting with said transmitter (6) an ultra-broadband measurement signal (16) located in a gigahertz frequency range;
    providing a sensor unit (8);
    receiving with said sensor unit an evaluation signal (20) induced by the measurement signal (16);
    providing a control unit (10);
    evaluating with said control unit (10) the evaluation signal (20) in a measurement result;
    investigating with the control unit (10) the frequency range for the presence of a signal (28) that is independent of the measurement signal (16) with the aid of the sensor unit (8), before transmitting (38, 60) the measurement signal (16); and
    dampening or preventing with the control unit (10) the transmission (60) of the measurement signal (16) when the signal (10) is detected.

13. A measurement device for measuring and representing a physical parameter, comprising:
    a transmitter (6) for transmitting (38, 60) an ultra-broadband measurement signal (16) located in a gigahertz frequency range;

a sensor unit (8) for receiving (40, 62) an evaluation signal (20) induced by the measurement signal (16); and a control unit (10) for evaluating (42, 66) the evaluation signal (20) in a measurement result, wherein the control unit (10) is configured to investigate the frequency range for the presence of a signal (28) that is independent of the measurement signal (16) with the aid of the sensor unit (8), before transmitting (38, 60) the measurement signal (16), wherein the control unit (10) is configured to dampen or prevent the transmission (60) of the measurement signal (16) when the signal (10) is detected.

14. A measuring device for measuring and representing a physical parameter, comprising:

a transmitter (6) for transmitting (38, 60) an ultra-broadband measurement signal (16) located in a gigahertz frequency range;

a sensor unit (8) for receiving (40, 62) an evaluation signal (20) induced by the measurement signal (16); and a control unit (10) for evaluating (42, 66) the evaluation signal (20) in a measurement result, wherein the control unit (10) is configured to investigate the frequency range for the presence of a signal (28) that is independent of the measurement signal (16) with the aid of the sensor unit (8), before transmitting (38, 60) the measurement signal (16), wherein the measurement signal is an information-carrying signal, wherein the control unit (10) is configured to dampen or prevent the transmission (60) of the measurement signal (16) when the signal (10) is detected.

\* \* \* \* \*